Dec. 8, 1970 K. CZIPTSCHIRSCH ET AL 3,545,157

SECTION BAR

Filed Oct. 1, 1965 3 Sheets-Sheet 1

INVENTORS
Kurt Cziptschirsch
BY Willi O. Treber

Robert K. Youtie
Attorney

United States Patent Office 3,545,157
Patented Dec. 8, 1970

3,545,157
SECTION BAR
Kurt Cziptschirsch, Am Heckendorn 43, Wuppertal-Barmen, Germany, and Willi O. Treber, Ober-Str. 18, Wuppertal-Elberfeld, Germany
Filed Oct. 1, 1965, Ser. No. 492,149
Claims priority, application Germany, Nov. 14, 1964, 1,475,022
Int. Cl. E04f 19/02
U.S. Cl. 52—717
3 Claims

ABSTRACT OF THE DISCLOSURE

A section bar, bead or molding strip having a U-shaped channel cross-section with a sheet metal outer portion and a resilient material inner lining. The sheet metal outer portion has reversely bent outer ends which are protected from marring the plate or plates to which the section bar is attached by immediately adjacent beads of the resilient material. The resilient material has one or more outwardly tapered sealing lips extending inwardly toward the web of the channel.

---

It is an object of the present invention to provide a section bar which has a high torsional resistance and can be clamped onto the edge of a plate or web and can easily be mounted without need for additional fastening means and without special tooling in such a manner that it is a press fit on its support and can be detached from it only with difficulty. Besides, the bar should be designed to afford a tight seal of the joint between two plates which are joined. The bar should also be compact and space-saving.

According to the invention, these objects are accomplished in that the trough of the section bar is internally lined with resiliently yielding material. In a preferred embodiment, the lining forms at least one sealing lip, which protrudes like a barb into the clamping mouth and tapers from the root toward its free end. Owing to its shape and resilient yieldability and its provision in the clamping mouth, the sealing lip yields toward the lining when the section bar is clamped onto the edge so that the section bar can easily and quickly be mounted and adheres with a clamping action.

A good fit of the section bar on the edge of the plate, which fit resists shakes and external forces, is achieved in that the free end of at least one sealing lip abuts a beaded plate edge.

For stiffening purposes and/or for increasing the clamping action, the lining of the section bar may be provided with an insert of springlike and/or flexible material.

The section bar according to the invention may be used to advantage in the manufacture of vehicles, particularly if the section bar has at least one profiled extension, according to another feature of the invention.

According to a further feature of the invention the free end of the profiled extension has a bead, which stiffens the edge of the extension and helps to avoid injuries because there is no sharp edge.

If the profiled extension consists, e.g., of a unilateral extension of the web of the section bar and if the section bar is clipped on a joint which is formed by a roof covering and a hoop protruding from the outside wall of the vehicle, the unilateral extension and the flange of the section bar, which flange meets the unilateral extension approximately at right angles, form a gutter whereas the sealing action is retained.

The invention comprehends also a design in which the unilateral extension of the web of the section bar forms itself a gutter. A section bar having this design is suitably employed when the end edge of the roof faces downwardly.

The section bar provided with a unilateral extension of its web may also be used as an internal seal of a window well. In this case the clamping mouth of the section bar embraces the free edge of a reinforcing bar, which is vertically arranged in the window well, whereas the extension of the web engages the edge of the inner lining of the door. The vibrations of the windowpane, which vibrations are at right angles to the plane of the pane, are cushioned by a brush consisting of pile fibers contacting the pane. This pile fibers cover the outside of that flange of the section bar which is remote from the web extension either throughout the area of said flange or in strip. The resulting section bar can be inserted quickly and conveniently when the window pane has already been fitted and will ensure a satisfactory press fit of the brush of pile fibers on the windowpane. This press fit cannot be accomplished with the known seals although they involve much higher manufacturing costs. With a slight modification, this embodiment of the section bar according to the invention may be used for sealing that portion of the window well which is disposed between the windowpane and the outside wall of the door.

In another desirable embodiment of the invention, the profiled extension consists of a bilateral extension of the web of the section bar. Such section bar may be used with extremely good results for fastening two adjoining facing panels and for covering the joint between them.

The section bar may be used for fastening the ends of facing panels if the profiled extension consists of a unilateral extension of the web or of an extension of a flange and the extension retains the edge of the panel.

In a particularly preferred embodiment of the invention, both flanges of the section bar are extended and curved toward the center of the cross-section of the section bar and form undercut recesses for receiving a separate section strip. This results in the advantage that the section bar may also be used to receive a sealing strip.

All the embodiments of the invention have the advantage that the shape of the section bar is desirable with a view to its use and for mass production.

Some illustrative embodiments of the invention are shown in enlarged views on the drawings, in which FIG. 1 is a transverse sectional view showing a horseshoe-shaped section bar which comprises a sealing lip protruding into the clamping mouth and a reinforcing insert embedded in the lining.

Figure 1:
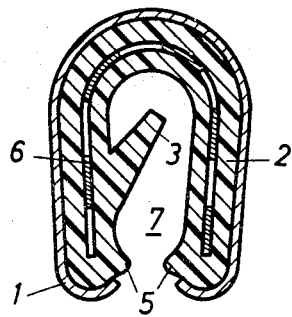

In the embodiment shown in FIG. 1, the inside wall of the horseshoe-shaped section bar 1 is covered by a lining 2 of resiliently yielding material. A reinforcing strip 6 of metal bent to the shape of a horseshoe is embedded in said lining. One flange wall of the lining 2 merges into a sealing lip 3, which tapers from its root toward its free end and protrudes like a barb into the clamping mouth 7. The entrance to the clamping mouth 7 is defined by two opposite sealing noses 5, which protrude from the lining 2.

Figure 2:
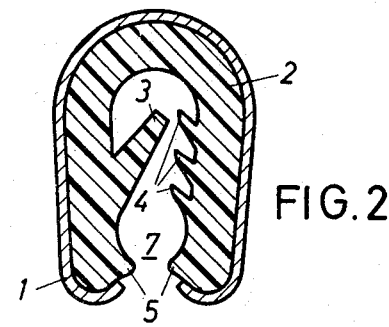
FIG. 2 is a transverse sectional view showing a horseshoe-shaped section bar, in which one inner flange wall of the lining has a large sealing lip and the other inner flange wall has a serrated sealing edge.

The embodiment of the section bar according to the invention shown in FIG. 2 differs from the example illustrated in FIG. 1 in that it comprises not only the sealing lip 3 protruding from one flange wall but also a barblike, serrated sealing edge, which projects from the opposite flange wall and has teeth 4 protruding into the clamping mouth 7. The lining 2 has no reinforcing insert.

Figure 3:
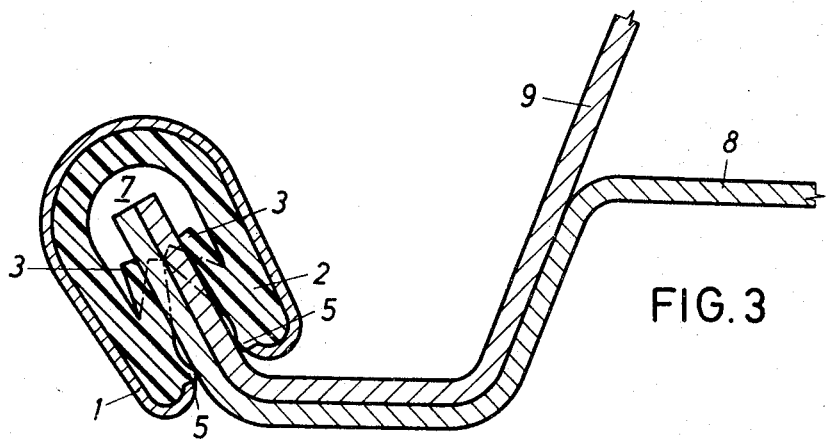
FIGS. 3 to 9 show in applied condition further embodiments of the section bar according to the invention in transverse sectional views.

According to FIG. 3, the section bar 1 is clamped on the edge of the gutter formed by the hoop 8 and the outside roof covering 9 and has two opposite sealing lips 3, which are of equal size and disposed in the clamping mouth 7. The sealing noses 5 are in sealing contact with the plate edge 8, 9 so that the metal parts will not be scratched.

Figure 4:
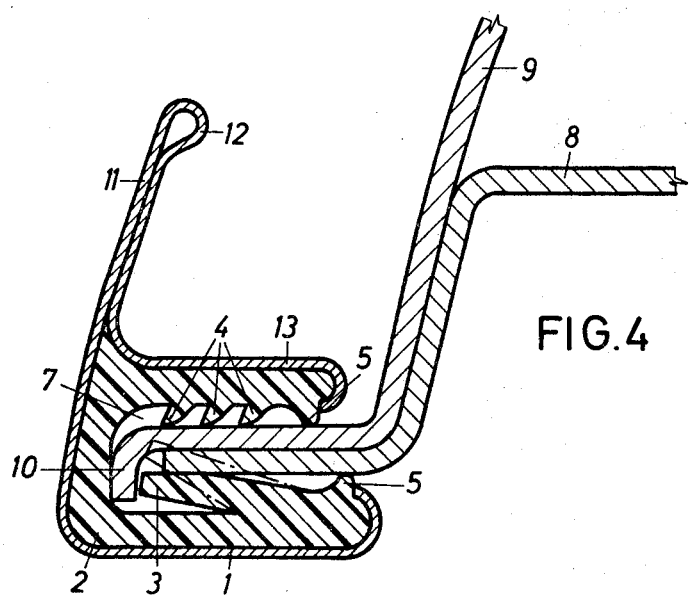

In the embodiment of FIG. 4, the section bar 1 is designed to be clamped to a horizontal roof terminating ledge so that the unilateral extension 11 of the web of the bar and the adjoining flange 13 form a gutter. When the section bar has been clipped in position, the free end of the sealing lip 3 engages the reversely bent edge 10 of the roof covering 9 so that the section bar is reliably and immovably fitted on the roof terminating ledge and can only be released when the clamping mouth 7 is intentionally spread open. Just as in the embodiment of FIG. 5, the free end of the extension 11 of the web is arcuately curved or folded to form a bead 12.

Figure 5:
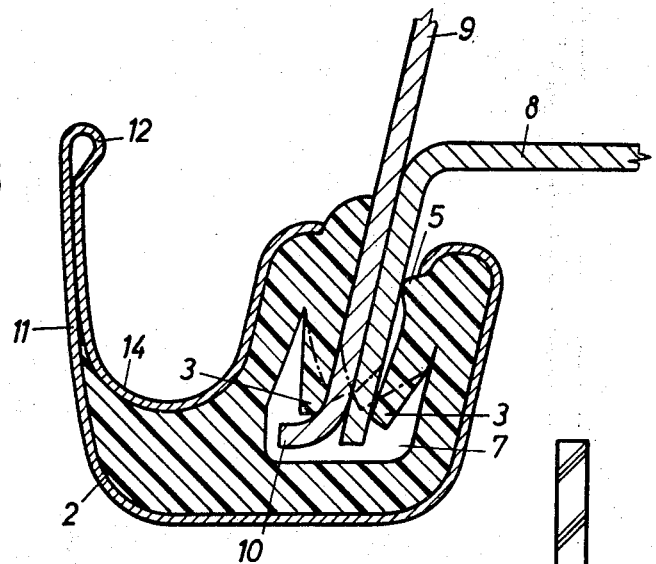

FIG. 5 shows a section bar which is fitted onto a downwardly facing roof edge. The unilateral extension 11 of the web and the adjoining flange define a gutter 14.

Figure 6:
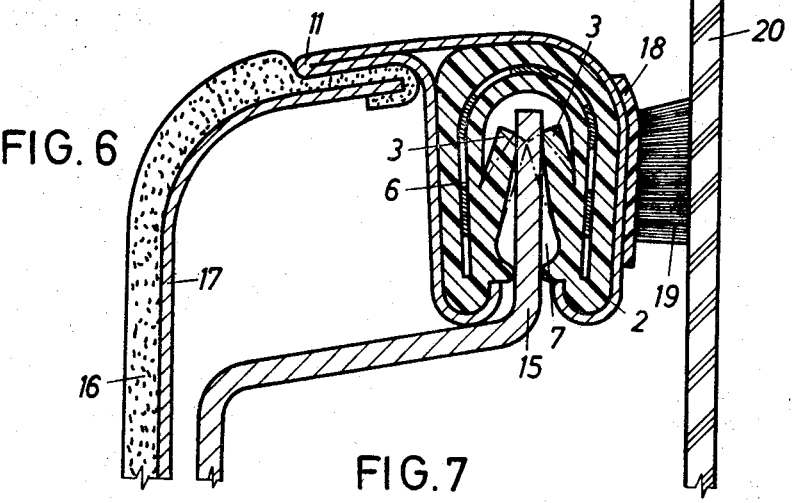

FIG. 6 shows a section bar which may be used for sealing a window well and which is mounted on a vertical plate edge 15. The unilateral extension 11 of the web is in sealing contact with a layer 16 of resiliently yielding material, which is bonded to the inside wall 17. A brush 19 consisting of pile fibers is connected by a woven fabric base to the outside of that flange of the section bar which is remote from the extension 11 of the web. The brush 19 is in close contact with the vertically displaceable windowpane.

Figure 7:
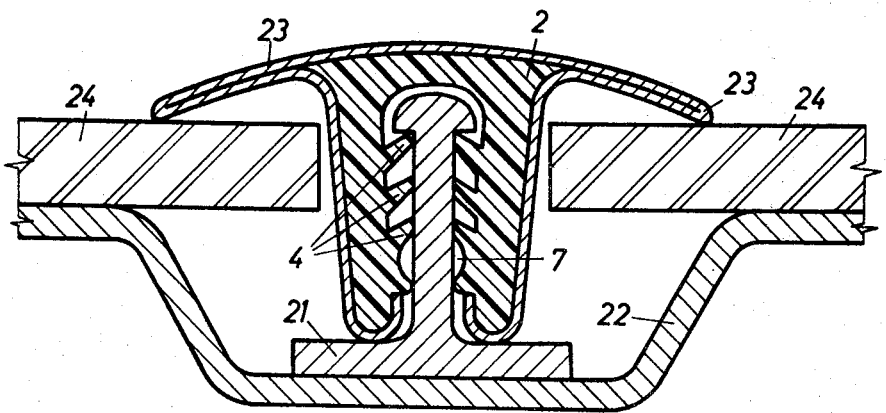

According to FIG. 7, the section bar is clamped onto a web 21, which is secured to an inwardly offset portion of a base plate 22. The facing panels 24 are urged against the base plate 22 by means of the bilateral extensions 23 of the web.

Figure 8:
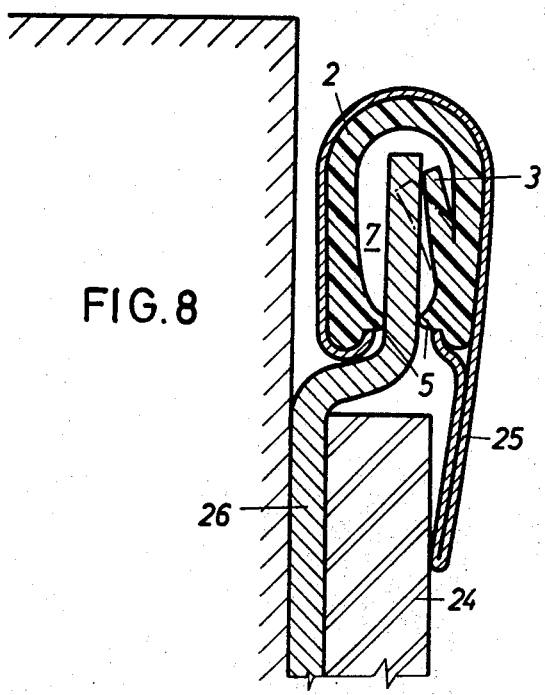

According to FIG. 8, the section bar provided with an extended flange is applied to one edge of the plate 26 and the extended flange 25 urges the facing panel 24 against the plate 26.

Figure 9:
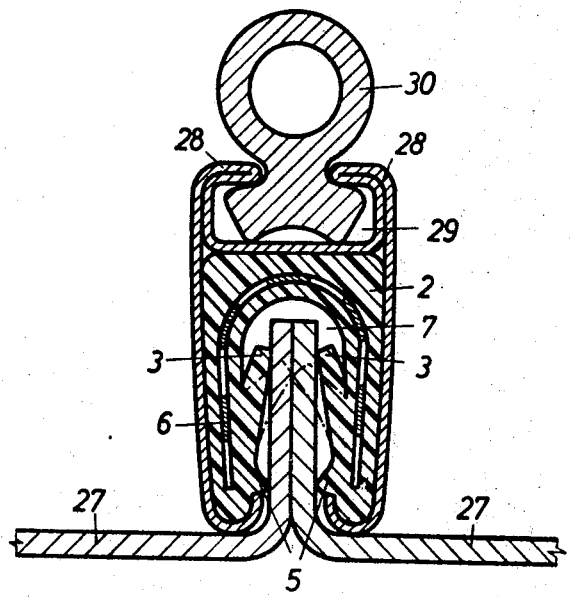

In the embodiment shown in FIG. 9, the angled edges of the two fixing plates 27 are welded together and extend into the clamping mouth 7 of the section bar 1. The ends of the two flange etxensions 28 are bent toward each other like pincers and shaped to define an undercut groove 29, which receives the fixing root of a separate sectional sealing strip 30.

What is claimed is:

1. An elongate molding strip for engaging the edge of a plate, said molding strip comprising an elongate stiff outer member of substantially constant generally U-shaped section having a pair of legs and a bite portion, a lining of resiliently yieldable material conformably received within said outer member, at least one sealing lip of resiliently yieldable material extending integrally from said lining obliquely inwardly toward said bite portion for deflection by a plate engaged in said outer member and resistance to removal of the plate, an inturned flange on the free end of each leg of said outer member in retaining engagement with the adjacent portion of said lining to prevent withdrawal of the latter from said outer member, and a pair of resiliently yieldable sealing members integrally protruding internally from said lining adjacent to respective flanges for sealing engagement with opposite sides of the plate.

2. An elongate molding strip according to claim 1, said sealing lip tapering toward its free end and being deflectable to snap engage beneath an enlargement on the plate.

3. An elongate molding strip according to claim 1, in combination with an additional sealing lip of resiliently yieldable material extending integrally from said lining opposite to said first mentioned sealing lip obliquely inwardly toward said bite portion for deflection by a plate engaged in said outer member and resistance to removal of the plate.

References Cited

UNITED STATES PATENTS

| 2,226,615 | 12/1940 | Killen | 49—462 |
|---|---|---|---|
| 2,583,702 | 1/1952 | Meyer | 5—353.1 |
| 2,704,687 | 3/1955 | Adell | 49—462 |
| 3,172,800 | 3/1965 | Truesdell | 52—717 |
| 3,238,689 | 3/1966 | Cook | 52—717 |
| 1,723,307 | 8/1929 | Sipe | 52—400 |
| 3,198,689 | 8/1965 | Lansing | 52—627X |
| 3,276,178 | 10/1966 | Letourneur et al. | 52—400 |

BOBBY R. GAY, Primary Examiner

A. M. CALVERT, Assistant Examiner